US012461576B2

(12) United States Patent
Rajagopal et al.

(10) Patent No.: US 12,461,576 B2
(45) Date of Patent: Nov. 4, 2025

(54) SIMULATING MULTI-SENSOR ENVIRONMENT FOR THERMAL THROTTLING IN STORAGE DEVICE

(71) Applicant: Sandisk Technologies, Inc., Milpitas, CA (US)

(72) Inventors: Sundararajan Rajagopal, Bangalore (IN); Vinod Sasidharan, Bangalore (IN); Ramanathan Muthiah, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 180 days.

(21) Appl. No.: 18/354,306

(22) Filed: Jul. 18, 2023

(65) Prior Publication Data

US 2024/0272688 A1    Aug. 15, 2024

Related U.S. Application Data

(60) Provisional application No. 63/444,806, filed on Feb. 10, 2023.

(51) Int. Cl.
*G06F 1/3206* (2019.01)
*G06F 1/20* (2006.01)
*G06F 1/324* (2019.01)

(52) U.S. Cl.
CPC ............ *G06F 1/206* (2013.01); *G06F 1/3206* (2013.01); *G06F 1/324* (2013.01)

(58) Field of Classification Search
CPC ......... G06F 1/206; G06F 1/3206; G06F 1/324
See application file for complete search history.

(56) References Cited

U.S. PATENT DOCUMENTS 8,762,097 B2    6/2014    Millet
2008/0028778 A1*  2/2008   Millet ..................... G06F 1/206
                                                          700/300

(Continued)

FOREIGN PATENT DOCUMENTS

CN          113608901 A     11/2021

OTHER PUBLICATIONS

Zheng, Chaolun, et al. "SSD Thermal Throttling Profile Prediction Using Neural Network," 2022 21st IEEE Intersociety Conference on Thermal and Thermomechanical Phenomena in Electronic Systems (iTherm). IEEE, 2022, 5 pages.

*Primary Examiner* — Gary Collins
(74) *Attorney, Agent, or Firm* — Morgan, Lewis & Bockius LLP

(57) ABSTRACT

Techniques described herein may be used for reducing the usage of sensors during thermal throttling in storage devices. A memory of a storage device may store map tables, each map table associated with a type of host command, each map table including entries, each entry corresponding to an initial temperature level and characteristics of a host command, and each entry indicating a change in temperature relative to the initial temperature level. A controller of the storage device may monitor operations for commands from the host system, obtain an initial temperature value from one or more temperature sensors, select entries from the map tables, based on characteristics of the operations and the initial temperature value, predict a current temperature based on the one or more entries, and in accordance with a determination that the current temperature exceeds a predetermined threshold, trigger one or more corrective actions for thermal throttling.

20 Claims, 17 Drawing Sheets

(56) References Cited

U.S. PATENT DOCUMENTS

| | | | |
|---|---|---|---|
| 2013/0046999 A1* | 2/2013 | Jung | G06F 1/206 |
| | | | 713/300 |
| 2019/0041928 A1 | 2/2019 | Bahirat | |
| 2019/0335353 A1* | 10/2019 | Kocagoez | H04W 24/08 |
| 2022/0155832 A1 | 5/2022 | Ravimohan et al. | |
| 2023/0076481 A1* | 3/2023 | Tang | G06F 3/0604 |

\* cited by examiner

Table 1 - Write — 328

| Current Temp Level | Write Speed | Duration | Change in Temp |
|---|---|---|---|
| T0 | X1 Bytes/Sec | Y1 Secs | Z1 Degrees |
| T0 | X2 Bytes/Sec | Y2 Secs | Z2 Degrees |
| T0 | X3 Bytes/Sec | Y3 Sec | Z3 Degrees |
| T0 | X4 Bytes/Sec | Y4 Secs | Z4 Degrees |
| T1 | X1 Bytes/Sec | Y1 Secs | Z5 Degrees |
| T1 | X2 Bytes/Sec | Y2 Secs | Z6 Degrees |
| T1 | X3 Bytes/Sec | Y3 Sec | Z7 Degrees |
| T1 | X4 Bytes/Sec | Y4 Secs | Z8 Degrees |

. . .

Writes with Different Speeds, at Different Temp Level are Tried and Calibrated

Figure 3B

Table 2 - Read — 330

| Current Temp Level | Read Speed | Duration | Change in Temp |
|---|---|---|---|
| T0 | X1 Bytes/Sec | Y1 Secs | Z1 Degrees |
| T0 | X2 Bytes/Sec | Y2 Secs | Z2 Degrees |
| T0 | X3 Bytes/Sec | Y3 Sec | Z3 Degrees |
| T0 | X4 Bytes/Sec | Y4 Secs | Z4 Degrees |
| T1 | X1 Bytes/Sec | Y1 Secs | Z5 Degrees |
| T1 | X2 Bytes/Sec | Y2 Secs | Z6 Degrees |
| T1 | X3 Bytes/Sec | Y3 Sec | Z7 Degrees |
| T1 | X4 Bytes/Sec | Y4 Secs | Z8 Degrees |
| ... | | | |

Reads with Different Speeds, at Different Temp Level are Tried and Calibrated

Figure 3C

*Table 3 - Mixed Reads & Writes* — 332

| Current Temp Level | Read Speed | Write Speed | Duration | Change in Temp |
|---|---|---|---|---|
| T0 | X1 Bytes/Sec | X2 Bytes/Sec | Y1 Secs | Z1 Degrees |
| T0 | X2 Bytes/Sec | X1 Bytes/Sec | Y2 Secs | Z2 Degrees |
| T0 | X3 Byes/Sec | X4 Bytes/Sec | Y3 Sec | Z3 Degrees |
| T0 | X4 Bytes/Sec | X3 Bytes/Sec | Y4 Secs | Z4 Degrees |
| T1 | X1 Bytes/Sec | X2 Bytes/Sec | Y1 Secs | Z5 Degrees |
| T1 | X2 Bytes/Sec | X1 Bytes/Sec | Y2 Secs | Z6 Degrees |
| T1 | X3 Byes/Sec | X4 Bytes/Sec | Y3 Sec | Z7 Degrees |
| T1 | X4 Bytes/Sec | X3 Byes/Sec | Y4 Secs | Z8 Degrees |
| ... | | | | |

Reads & Writes with Different Speeds, at Different Temp Level are Tried and Calibrated

| Table 4 - Non Media Commands ||||
| Current Temp Level | No of Commands/Sec | Duration | Change in Temp |
| --- | --- | --- | --- |
| T0 | X1 Commands/Sec | Y1 Secs | Z1 Degrees |
| T0 | X2 Commands/Sec | Y2 Secs | Z2 Degrees |
| T0 | X3 Commands/Sec | Y3 Sec | Z3 Degrees |
| T0 | X4 Commands/Sec | Y4 Secs | Z4 Degrees |
| T1 | X1 Commands/Sec | Y1 Secs | Z5 Degrees |
| T1 | X2 Commands/Sec | Y2 Secs | Z6 Degrees |
| T1 | X3 Commands/Sec | Y3 Sec | Z7 Degrees |
| T1 | X4 Commands/Sec | Y4 Secs | Z8 Degrees |
| . . . | | | |

Commands Sent by Host that does not Require Flash Access

Table 5 - No Operations

| Current Temp Level | Duration | Change in Temp |
|---|---|---|
| T0 | Y1 Secs | Z1 Degrees |
| T0 | Y2 Secs | Z2 Degrees |
| T0 | Y3 Sec | Z3 Degrees |
| T0 | Y4 Secs | Z4 Degrees |
| T1 | Y1 Secs | Z5 Degrees |
| T1 | Y2 Secs | Z6 Degrees |
| T1 | Y3 Sec | Z7 Degrees |
| T1 | Y4 Secs | Z8 Degrees |
| ... | | |

No Commands from Host and No Internal Operations. This will Cool Down the Device

Figure 3F

Table 6 - Low Power Modes ~ 338

| Current Temp Level | Low Power Mode | Duration | Change in Temp |
|---|---|---|---|
| T0 | Standby | Y1 Secs | Z1 Degrees |
| T0 | Shutdown | Y2 Secs | Z2 Degrees |
| T0 | GSD | Y3 Sec | Z3 Degrees |
| T0 | No Host Read Write | Y4 Secs | Z4 Degrees |
| T1 | Standby | Y1 Secs | Z5 Degrees |
| T1 | Shutdown | Y2 Secs | Z6 Degrees |
| T1 | GSD | Y3 Sec | Z7 Degrees |
| T1 | No Host Read Write | Y4 Secs | Z8 Degrees |
| ... | | | |

Device is Put to Different Low Power Modes by Host / Based on Internal Triggers. This will Cool Down

Figure 3G

Table 7 - Internal Reads & Writes – during Host Reads — 336

| Current Temp Level | Read Speed | Duration | Change in Temp |
|---|---|---|---|
| T0 | X1 Bytes/Sec | Y1 Secs | Z1 Degrees |
| T0 | X2 Bytes/Sec | Y2 Secs | Z2 Degrees |
| T0 | X3 Byes/Sec | Y3 Sec | Z3 Degrees |
| T0 | X4 Bytes/Sec | Y4 Secs | Z4 Degrees |
| T1 | X1 Bytes/Sec | Y1 Secs | Z5 Degrees |
| T1 | X2 Bytes/Sec | Y2 Secs | Z6 Degrees |
| T1 | X3 Bytes/Sec | Y3 Sec | Z7 Degrees |
| T1 | X4 Bytes/Sec | Y4 Secs | Z8 Degrees |
| ... | | | |

Internal Reads/Writes for Relocation/Control Reads Triggered Along with Host Reads

Figure 3H

Table 8 – Internal Reads & Writes – During Host Writes ~342

| Current Temp Level | Read Speed | Duration | Change in Temp |
|---|---|---|---|
| T0 | X1 Bytes/Sec | Y1 Secs | Z1 Degrees |
| T0 | X2 Bytes/Sec | Y2 Secs | Z2 Degrees |
| T0 | X3 Bytes/Sec | Y3 Sec | Z3 Degrees |
| T0 | X4 Bytes/Sec | Y4 Secs | Z4 Degrees |
| T1 | X1 Bytes/Sec | Y1 Secs | Z5 Degrees |
| T1 | X2 Bytes/Sec | Y2 Secs | Z6 Degrees |
| T1 | X3 Bytes/Sec | Y3 Sec | Z7 Degrees |
| T1 | X4 Bytes/Sec | Y4 Secs | Z8 Degrees |
| ... | | | |

Internal Reads/Writes for Relocation/Control Reads Triggered Along with Host Writes

Table 9 – Internal Reads & with Mixed Reads & Writes

| Current Temp Level | Read Speed | Write Speed | Duration | Change in Temp |
|---|---|---|---|---|
| T0 | X1 Bytes/Sec | X2 Bytes/Sec | Y1 Secs | Z1 Degrees |
| T0 | X2 Bytes/Sec | X1 Bytes/Sec | Y2 Secs | Z2 Degrees |
| T0 | X3 Bytes/Sec | X4 Bytes/Sec | Y3 Sec | Z3 Degrees |
| T0 | X4 Bytes/Sec | X3 Bytes/Sec | Y4 Secs | Z4 Degrees |
| T1 | X1 Bytes/Sec | X2 Bytes/Sec | Y1 Secs | Z5 Degrees |
| T1 | X2 Bytes/Sec | X1 Bytes/Sec | Y2 Secs | Z6 Degrees |
| T1 | X3 Bytes/Sec | X4 Bytes/Sec | Y3 Sec | Z7 Degrees |
| T1 | X4 Bytes/Sec | X3 Bytes/Sec | Y4 Secs | Z8 Degrees |
| ... | | | | |

Internal Reads & Writes for Relocation, Control Reads Triggered Along with Mixes Reads and Writes

| TABLE 1 - WRITE | | |
|---|---|---|
| CURRENT TEMP LEVEL | WRITE SPEED | DURATION | CHANGE IN TEMP |
| T0 | X1 BYTES/SEC | Y1 SECS | Z1 DEGREES |
| T0 | X2 BYTES/SEC | Y2 SECS | Z2 DEGREES |
| T0 | X3 BYTES/SEC | Y3 SEC | Z3 DEGREES |
| T0 | X4 BYTES/SEC | Y4 SECS | Z4 DEGREES |
| T1 | X1 BYTES/SEC | Y1 SECS | Z5 DEGREES |
| T1 | X2 BYTES/SEC | Y2 SECS | Z6 DEGREES |
| T1 | X3 BYTES/SEC | Y3 SEC | Z7 DEGREES |
| T1 | X4 BYTES/SEC | Y4 SECS | Z8 DEGREES |
| ... | ... | ... | ... |

604

| TABLE 3 - NON MEDIA COMMANDS | | |
|---|---|---|
| CURRENT TEMP LEVEL | WRITE SPEED | DURATION | CHANGE IN TEMP |
| T0 | X1 COMMANDS/SEC | Y1 SECS | Z1 DEGREES |
| T0 | X2 COMMANDS/SEC | Y2 SECS | Z2 DEGREES |
| T0 | X3 COMMANDS/SEC | Y3 SEC | Z3 DEGREES |
| T0 | X4 COMMANDS/SEC | Y4 SECS | Z4 DEGREES |
| T1 | X1 COMMANDS/SEC | Y1 SECS | Z5 DEGREES |
| T1 | X2 COMMANDS/SEC | Y2 SECS | Z6 DEGREES |
| T1 | X3 COMMANDS/SEC | Y3 SEC | Z7 DEGREES |
| T1 | X4 COMMANDS/SEC | Y4 SECS | Z8 DEGREES |
| ... | ... | ... | ... |

606

| TABLE 2 - READ | | |
|---|---|---|
| CURRENT TEMP LEVEL | WRITE SPEED | DURATION | CHANGE IN TEMP |
| T0 | X1 BYTES/SEC | Y1 SECS | Z1 DEGREES |
| T0 | X2 BYTES/SEC | Y2 SECS | Z2 DEGREES |
| T0 | X3 BYTES/SEC | Y3 SEC | Z3 DEGREES |
| T0 | X4 BYTES/SEC | Y4 SECS | Z4 DEGREES |
| T1 | X1 BYTES/SEC | Y1 SECS | Z5 DEGREES |
| T1 | X2 BYTES/SEC | Y2 SECS | Z6 DEGREES |
| T1 | X3 BYTES/SEC | Y3 SEC | Z7 DEGREES |
| T1 | X4 BYTES/SEC | Y4 SECS | Z8 DEGREES |
| ... | ... | ... | ... |

608

| TABLE 4 - NO OPERATION | |
|---|---|
| CURRENT TEMP LEVEL | DURATION | CHANGE IN TEMP |
| T0 | Y1 SECS | Z1 DEGREES |
| T0 | Y2 SECS | Z2 DEGREES |
| T0 | Y3 SEC | Z3 DEGREES |
| T0 | Y4 SECS | Z4 DEGREES |
| T1 | Y1 SECS | Z5 DEGREES |
| T1 | Y2 SECS | Z6 DEGREES |
| T1 | Y3 SEC | Z7 DEGREES |
| T1 | Y4 SECS | Z8 DEGREES |
| ... | ... | ... |

Figure 6B

SIMULATING MULTI-SENSOR ENVIRONMENT FOR THERMAL THROTTLING IN STORAGE DEVICE

CROSS-REFERENCE TO RELATED APPLICATION

This application claims the benefit of U.S. Provisional Application No. 63/444,806, filed on Feb. 10, 2023, the entirety of which is incorporated herein by reference for all purposes.

BACKGROUND

A storage system can be used to store data from a host. The host can request that the storage system store the data in a logical address, and the storage system can maintain a logical-to-physical address table to correlate logical and physical addresses. The storage system can implement data management algorithms, which can move the data to a different physical address than the one in which the data was initially stored.

Temperature of a storage device (e.g., a solid state drive) can increase on continuous usage or during heavy read or write operations. This temperature increase impacts the life of the device. In conventional devices, temperature sensors are deployed across different modules of a device to continuously monitor the device temperature at multiple locations. When temperature exceeds a certain threshold, the storage device performs thermal throttling to cool down the device. Such throttling may include frequency downscaling and/or die down scaling. Multiple sensors are deployed at different modules of the device, as a temperature rise in the device is not uniform. Each sensor needs to have a minimum accuracy. Production cost for a device increases proportional to the number of sensors.

The description provided in the background section should not be assumed to be prior art merely because it is mentioned in or associated with the background section. The background section may include information that describes one or more aspects of the subject technology, and the description in this section does not limit the invention.

BRIEF DESCRIPTION OF THE DRAWINGS

A detailed description will be made with reference to the accompanying drawings:

FIGS. 3B-3J show examples of map tables, according to one or more embodiments.

FIG. 6B shows examples of map tables, according to one or more embodiments.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology may be practiced without these specific details. In some instances, structures and components are shown in block diagram form in order to avoid obscuring the concepts of the subject technology. Like components are labeled with identical element numbers for ease of understanding.

The present description relates in general to data storage systems and methods, and more particularly to, for example, without limitation, providing temperature control in a data storage device. Techniques described herein may be used for reducing the usage of sensors during thermal throttling in storage devices.

A method is provided for identifying different sets of usage patterns and corresponding temperature increase. Some aspects use that data for predicting temperature levels in a storage device, without a need for a real sensor. In some aspects, device usage patterns that cause temperature increase may be identified. A map table of the patterns and the temperature changes may be created and downloaded as a configuration to a device. When the device is used, the device may monitor the current usage pattern and/or predict the current temperature of the device using the map table. The device may then check if the predicted temperature level exceeds a threshold temperature level. If the temperature exceeds the threshold, the device may trigger actions to cool down the device. In this way, a storage device according to the techniques described herein may predict the temperature of the device without a need for multiple sensors. Conventional thermal throttling may be performed in addition to techniques described herein.

Figure 1:
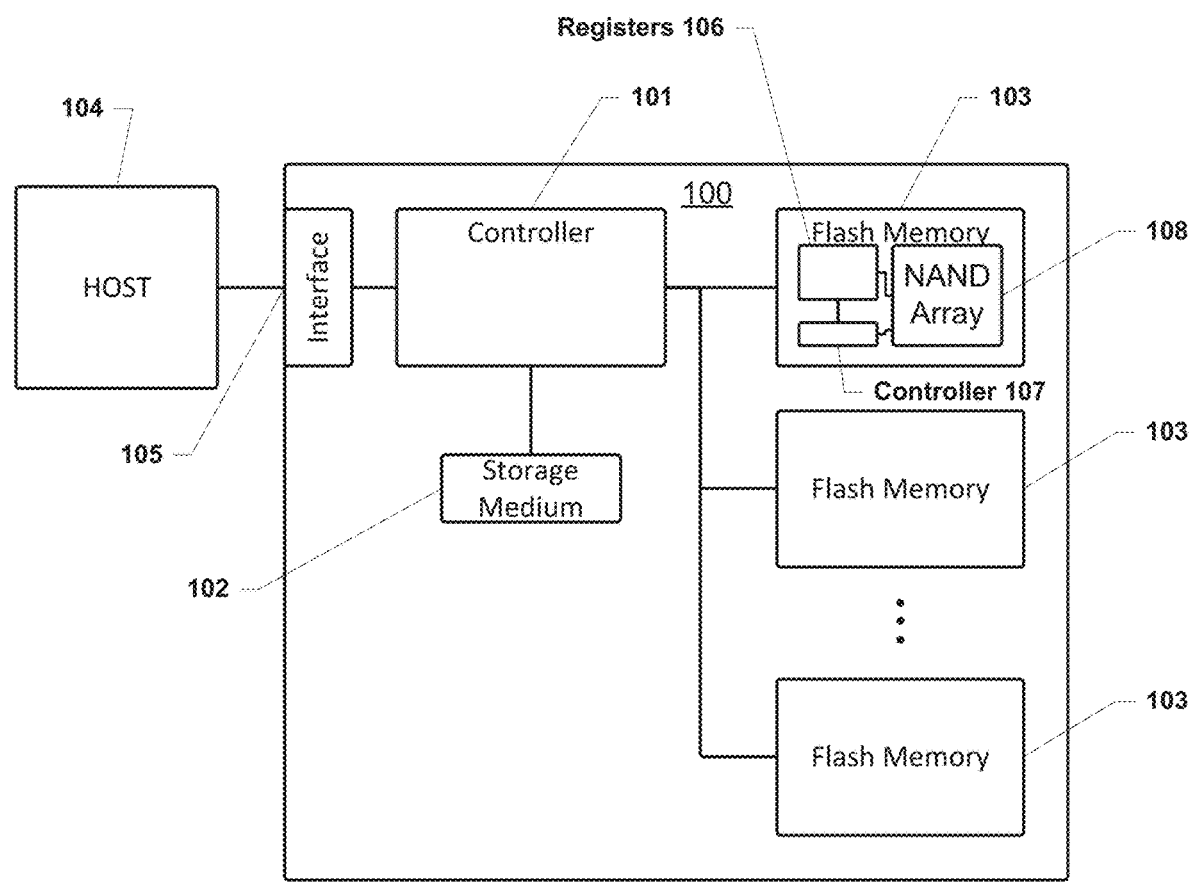
FIG. 1 is a block diagram illustrating components of an example data storage system, according to one or more embodiments.

FIG. 1 is a block diagram illustrating components of an example data storage system, according to aspects of the subject technology. A data storage system may be sometimes referred to as a system, a data storage device, a storage device, or a device. As depicted in FIG. 1, in some aspects, a data storage system 100 (e.g., a solid-state drive (SSD)) includes a data storage controller 101, a storage medium 102, and a flash memory array including one or more flash memory 103. The controller 101 may use the storage medium 102 for temporary storage of data and information used to manage the data storage system 100. The controller 101 may include several internal components (not shown), such as a read-only memory, other types of memory, a flash component interface (e.g., a multiplexer to manage instruction and data transport along a serial connection to the flash memory 103), an input/output (I/O) interface, error correction circuitry, and the like. In some aspects, the elements of the controller 101 may be integrated into a single chip. In other aspects, these elements may be separated on their own personal computer (PC) board.

In some implementations, aspects of the subject disclosure may be implemented in the data storage system 100. For example, aspects of the subject disclosure may be integrated with the function of the data storage controller 101 or may be implemented as separate components for use in conjunction with the data storage controller 101.

The controller 101 may also include a processor that may be configured to execute code or instructions to perform the operations and functionality described herein, manage request flow and address mappings, and to perform calculations and generate commands. The processor of the controller 101 may be configured to monitor and/or control the operation of the components in the data storage controller 101. The processor may be a microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on read-only-memory (ROM) within the controller 101 and/or its processor. One or more sequences of instructions may be software stored and read from the storage medium 102, the flash memory 103, or received from a host device 104 (e.g., via a host interface 105). ROM, the storage medium 102, the flash memory 103, represent examples of machine or computer readable media on which instructions/code executable by the controller 101 and/or its processor may be stored. Machine or computer readable media may generally refer to any medium or media used to provide instructions to the controller 101 and/or its processor, including volatile media, such as dynamic memory used for the storage media 102 or for buffers within the controller 101, and non-volatile media, such as electronic media, optical media, and magnetic media.

In some aspects, the controller 101 may be configured to store data received from the host device 104 in the flash memory 103 in response to a write command from the host device 104. The controller 101 is further configured to read data stored in the flash memory 103 and to transfer the read data to the host device 104 in response to a read command from the host device 104. A host device 104 may be sometimes referred to as a host, a host system, or a host computer.

The host device 104 represents any device configured to be coupled to the data storage system 100 and to store data in the data storage system 100. The host device 104 may be a computing system such as a personal computer, a server, a workstation, a laptop computer, a personal digital assistant (PDA), a smart phone, or the like. Alternatively, the host device 104 may be an electronic device such as a digital camera, a digital audio player, a digital video recorder, or the like.

In some aspects, the storage medium 102 represents volatile memory used to temporarily store data and information used to manage the data storage system 100. According to aspects of the subject technology, the storage medium 102 is random access memory (RAM), such as double data rate (DDR) RAM. Other types of RAMs may be also used to implement the storage medium 102. The memory 102 may be implemented using a single RAM module or multiple RAM modules. While the storage medium 102 is depicted as being distinct from the controller 101, those skilled in the art will recognize that the storage medium 102 may be incorporated into the controller 101 without departing from the scope of the subject technology. Alternatively, the storage medium 102 may be a non-volatile memory, such as a magnetic disk, flash memory, peripheral SSD, and the like.

As further depicted in FIG. 1, the data storage system 100 may also include the host interface 105. The host interface 105 may be configured to be operably coupled (e.g., by wired or wireless connection) to the host device 104, to receive data from the host device 104 and to send data to the host device 104. The host interface 105 may include electrical and physical connections, or a wireless connection, for operably coupling the host device 104 to the controller 101 (e.g., via the I/O interface of the controller 101). The host interface 105 may be configured to communicate data, addresses, and control signals between the host device 104 and the controller 101. Alternatively, the I/O interface of the controller 101 may include and/or be combined with the host interface 105. The host interface 105 may be configured to implement a standard interface, such as a small computer system interface (SCSI), a serial-attached SCSI (SAS), a fibre channel interface, a peripheral component interconnect express (PCIe), a serial advanced technology attachment (SATA), a universal serial bus (USB), or the like. The host interface 105 may be configured to implement only one interface. Alternatively, the host interface 105 (and/or the I/O interface of controller 101) may be configured to implement multiple interfaces, which may be individually selectable using a configuration parameter selected by a user or programmed at the time of assembly. The host interface 105 may include one or more buffers for buffering transmissions between the host device 104 and the controller 101. The host interface 105 (or a front end of the controller 101) may include a submission queue 110 to receive commands from the host device 104. For input-output (I/O), the host device 104 may send commands, which may be received by the submission queue 110 (e.g., a fixed size circular buffer space). In some aspects, the submission queue may be in the controller 101. In some aspects, the host device 104 may have a submission queue. The host device 104 may trigger a doorbell register when commands are ready to be executed. The controller 101 may then pick up entries from the submission queue in the order the commands are received, or in an order of priority.

The flash memory 103 may represent a non-volatile memory device for storing data. According to aspects of the subject technology, the flash memory 103 includes, for example, a not-and (NAND) flash memory. The flash memory 503 may include a single flash memory device or chip, or (as depicted in FIG. 1) may include multiple flash memory devices or chips arranged in multiple channels. The flash memory 103 is not limited to any capacity or configuration. For example, the number of physical blocks, the number of physical pages per physical block, the number of sectors per physical page, and the size of the sectors may vary within the scope of the subject technology.

The flash memory may have a standard interface specification so that chips from multiple manufacturers can be used interchangeably (at least to a large degree). The interface hides the inner working of the flash and returns only internally detected bit values for data. In aspects, the interface of the flash memory 103 is used to access one or more internal registers 106 and an internal flash controller 107 for communication by external devices (e.g., the controller 101). In some aspects, the registers 106 may include address, command, and/or data registers, which internally retrieve and output the necessary data to and from a NAND memory cell array 108. A NAND memory cell array 108 may be sometimes referred to as a NAND array, a memory array, or a NAND. For example, a data register may include data to be stored in the memory array 108, or data after a fetch from the memory array 108 and may also be used for temporary data storage and/or act like a buffer. An address register may store the memory address from which data will be fetched to the host device 104 or the address to which data will be sent and stored. In some aspects, a command register is included to control parity, interrupt control, and the like. In some aspects, the internal flash controller 107 is accessible via a control register to control the general behaviour of the flash memory 103. The internal flash controller 107 and/or the control register may control the number of stop bits, word length, receiver clock source, and may also control switching the addressing mode, paging control, coprocessor control, and the like.

In some aspects, the registers 106 may also include a test register. The test register may be accessed by specific addresses and/or data combinations provided at the interface of flash memory 103 (e.g., by specialized software provided by the manufacturer to perform various tests on the internal components of the flash memory). In further aspects, the test register may be used to access and/or modify other internal registers, for example the command and/or control registers. In some aspects, test modes accessible via the test register may be used to input or modify certain programming conditions of the flash memory 103 (e.g., read levels) to dynamically vary how data is read from the memory cells of the memory arrays 108. The registers 106 may also include one or more data latches coupled to the flash memory 103.

It should be understood that in all cases data may not always be the result of a command received from the host 104 and/or returned to the host 104. In some aspects, the controller 101 may be configured to execute a read operation independent of the host 104 (e.g., to verify read levels or BER). The predicate words "configured to," "operable to," and "programmed to" as used herein do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The controller 101 may perform the operations identified in blocks 702-712. The controller 101 may cause the operations identified in blocks 702-712 to occur, or the controller 101 may provide instructions to cause or facilitate the controller 107 (and the registers 106) to perform operations identified in blocks 702-712.

Some aspects may identify device usage patterns, such as continuous reads or writes, number of reads or writes per second, time for which a device is in an active state, etc. that may cause the temperature increase. The device usage pattern may be categorized to different temperature levels and a map table may be created. In some aspects, the map table may be downloaded to a storage device.

When a device is in use, a firmware of the device may check current pattern of data accesses. Based on the current pattern, the firmware may predict the device temperature level by using characterization data stored in the map table. Based on the detected temperature level, the device may take actions (e.g., frequency scaling for reducing frequency of select functional blocks, die scaling for reducing parallel operations of die access) to reduce the temperature. Details captured in a map table and example procedures to use the map table to predict the current temperature of the device are described below in detail, according to one or more embodiments. Using the techniques described herein, the need for sensors may be reduced drastically (e.g., to a minimum of one sensor, to detect a start-up temperature), thereby saving cost for each storage device.

Figure 2:
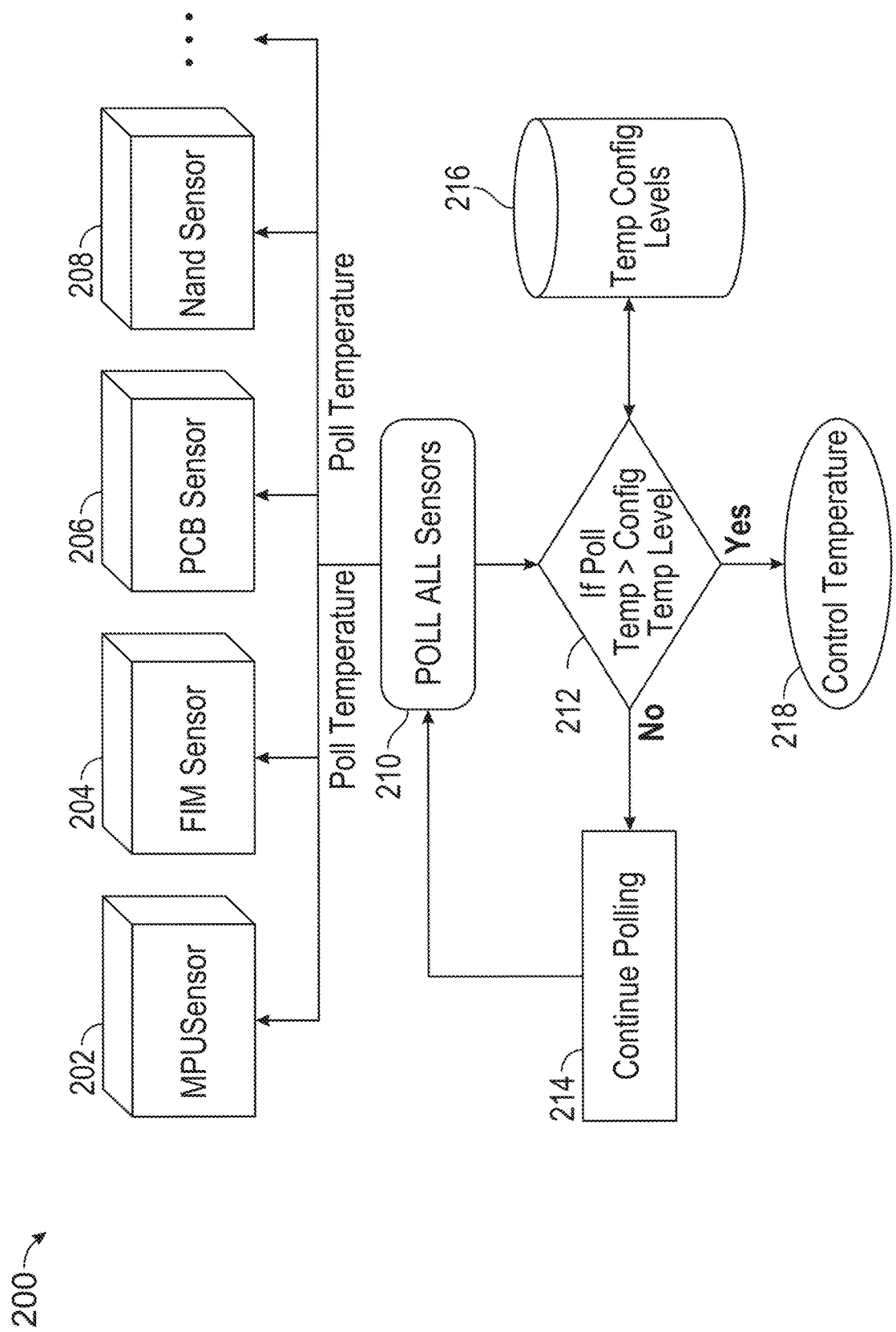
FIG. 2 shows an example mechanism for thermal throttling, according to one or more embodiments.

FIG. 2 shows an example mechanism 200 for thermal throttling, according to one or more embodiments. In some aspects, thermal management or throttling may be achieved using temperature sensors mounted at different modules in the device. Steps described below may be used for thermal throttling. In some aspects, the device may contain one or more sensors mounted at main central processing units (CPUs) (e.g., MPU sensor 202), flash interface module (FIM) (e.g., FIM sensor 204), printed circuit boards (PCBs) (e.g., PCB sensor 206), and/or NAND dies (e.g., NAND sensor 208), etc. The device may be also configured with different throttling levels 216 (e.g., action to be taken to cool down when temperature crosses different levels). In some aspects, the firmware may poll (210) all the sensors periodically and may acquire the maximum temperature across all sensors. The firmware may check (212) if the current maximum temperature crosses a specific temperature threshold level, and if the current maximum temperature crosses the threshold, the firmware may take one or more actions (218) according to the configuration (e.g., frequency downscaling, die downscaling) to cool down the device. Otherwise, the device may continue polling (214) the sensors.

In some aspects, a storage controller may simulate a multi-sensor environment from one sensor base data and a preloaded workload mapping table. A base sensor (and may be the only sensor) may be strategically placed in the device to accomplish this. In some aspects, the controller may simulate hardware sensors through characterization, mapping and/or analysis, and further takes similar actions (as a legacy storage with actual sensors) to reduce the thermal effects. This may enable cost effective solution in high volume retail storage devices. Some aspects may create a thermal mapping table for multiple base temperatures (start temperature) against corresponding workloads learned during pre-production phase and use the same for predicting the temperature level in a product.

In some aspects, a flash translation layer (FTL) may additionally make sure that a die which is close to a base sensor is the busiest die in a product so as to enable the firmware logic to proactively throttle rather than heating up a device more than what a device can handle. As described earlier, a base sensor (and the only sensor) may be strategically placed to accomplish this. Some aspects may generate the map that may be continuously updated based on real-time behaviour across different kinds of devices and may be monitored over a long period of time.

Figure 3A:
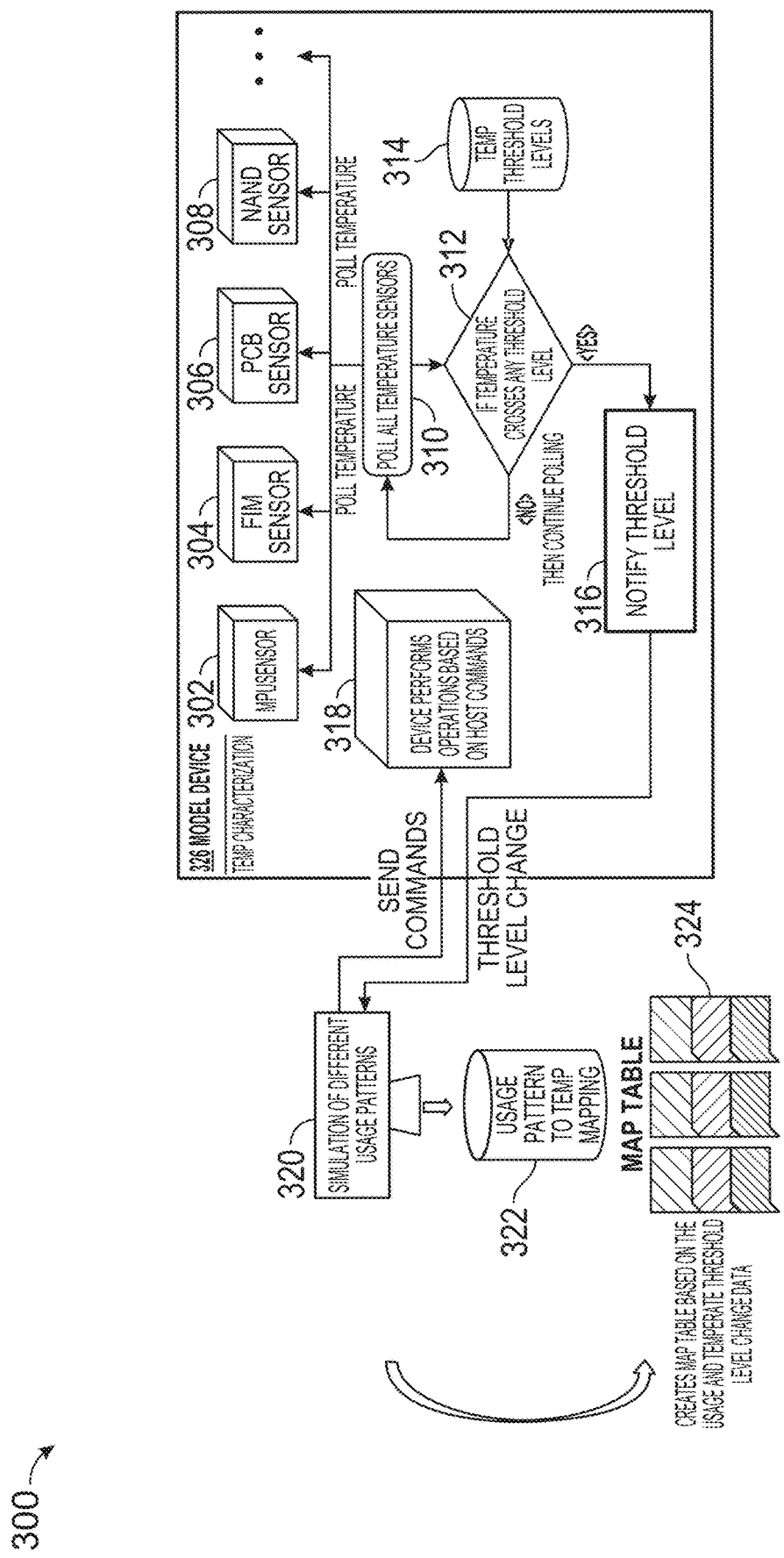
FIG. 3A shows example characterization and map table generation using a model device, according to one or more embodiments.

The need for multiple sensors may be reduced by following a multi-step approach. A first step may include characterization and mapping, performed during a design phase, pre-production stage of a storage device, a model device, which may have all the required temperature sensors, may be used for the characterization. FIG. 3A shows example characterization and map table generation 300 using a model device 326, according to one or more embodiments. The model device 326 may possess the hardware architecture similar to an actual device, except that temperature sensors may be connected and the model device may have firmware code that periodically polls the sensors.

Similar to the device described above in reference to FIG. 2, the model device 326 may contain one or more sensors mounted at main central processing units (CPUs) (e.g., MPU sensor 302), flash interface module (FIM) (e.g., FIM sensor 304), printed circuit boards (PCBs) (e.g., PCB sensor 306), and/or NAND dies (e.g., NAND sensor 308), etc. The model device 326 may be also configured with different throttling levels 314. In some aspects, the firmware of the model device 326 may poll (310) all the sensors periodically and may acquire the maximum temperature across all sensors. The firmware may check (312) if the current maximum temperature crosses a specific temperature threshold level, and if the current maximum temperature crosses the threshold, the firmware may notify the threshold level change to a simulation module 320 that may be configured to simulate different usage patterns by sending commands so that the device performs (318) operations based on the simulated host commands. The threshold level changes may be accumulated and/or analysed to determine a usage pattern to temperature mapping (322) to thereby obtain a map table 324.

The characterization may be performed once for a particular product type or a set of related product types. Different read or write scenarios may be simulated, through scripts running in a host machine (to which the storage device is connected) and temperature of the sensors may be monitored. Temperature changes on several patterns, starting at multiple given base temperatures, may be identified. For instance, the following temperature changes may be identified: (i) temperature levels reached based on number of bytes read for X number of seconds; (ii) temperature levels reached based on number of bytes written for X number of seconds; (iii) temperature levels reached for long reads and writes; (iv) temperature levels reached based on the duration for which the device is powered on; and/or (v) temperature levels reached when no operations are performed. No operations (sometimes referred to as noops) may cool down the device and hence the temperature level may likely reduce. Key patterns contributing to temperature increase may be identified and a map table is created.

Through different usage patterns in the characterization, the map tables 324 may be created. Examples of map tables are shown in FIGS. 3B-3J, according to one or more embodiments. Table 328 shown in FIG. 3B corresponds to a table for write commands, and includes current temperature levels, write speeds, duration, and change in temperature, as columns. Writes with different speeds, at different temperature levels may be tested and/or calibrated. Table 330 shown in FIG. 3C corresponds to read commands, and includes current temperature level, read speeds, duration, and change in temperature, as columns. Reads with different speeds, at different temperature levels may be tested and/or calibrated. Table 332 shown in FIG. 3D corresponds to mixed reads and writes, and includes current temperature level, read speed, write speed, duration, and change in temperature, as columns. Reads and writes with different speeds, at different temperature levels may be tested and/or calibrated. Table 334 shown in FIG. 3E corresponds to non-media commands, and includes current temperature level, number of commands per second, duration, and change in temperature, as columns. Non-media commands may include commands sent by host that may not require flash memory access. Table 336 shown in FIG. 3F corresponds to no operation, and includes current temperature level, duration, and change in temperature, as columns. No commands from host and no internal operations may cool down the device. Table 338 shown in FIG. 3G corresponds to low power modes, and includes current temperature level, low power mode, duration, and change in temperature, as columns. Device may be put to different low power modes by host or may be based on internal triggers. Such low power modes may cool down the device. Table 340 shown in FIG. 3H corresponds to internal reads and writes during host reads, and includes current temperature level, read speed, duration, and change in temperature, as columns. Internal reads and/or writes for relocation and/or control reads may be triggered along with host reads. Table 342 shown in FIG. 3I corresponds to internal reads and writes during host writes, and includes current temperature level, duration, and change in temperature, as columns. Internal reads and/or writes for relocation and/or control reads may be triggered along with host writes. Table 344 shown in FIG. 3J corresponds to internal reads and writes with mixed reads and writes, and includes current temperature level, read speed, write speed, duration, and change in temperature, as columns. Internal reads and/or writes for relocation and/or control reads may be triggered along with mixed reads and writes. In these tables, each row corresponds to a temperature level.

These patterns of characterization may be further extended to a mixture of read or write patterns and changes in temperature may be measured. Pattern testing with high environmental temperature may be performed. Device may be connected and be idle for longer period of time (e.g., 1 day). The above data may be arrived after multiple iterations of testing with multiple patterns. If more iterations and patterns are used, the values obtained are likely to be closer to real temperatures that will be measured by a physical sensor. Each of the pattern may be tested by subjecting the device to different start-up temperatures (referred to as 'Current Temp level' in the above example map table). One way to achieve this is by pre-running heavy operations and causing the device to reach the temperature before trying with the pattern. A no operation may cause reduction in temperature and hence the change in temperature may be negative. Similarly, temperature may be reduced by only performing non-media commands at a higher start-up temperature.

Figure 4:
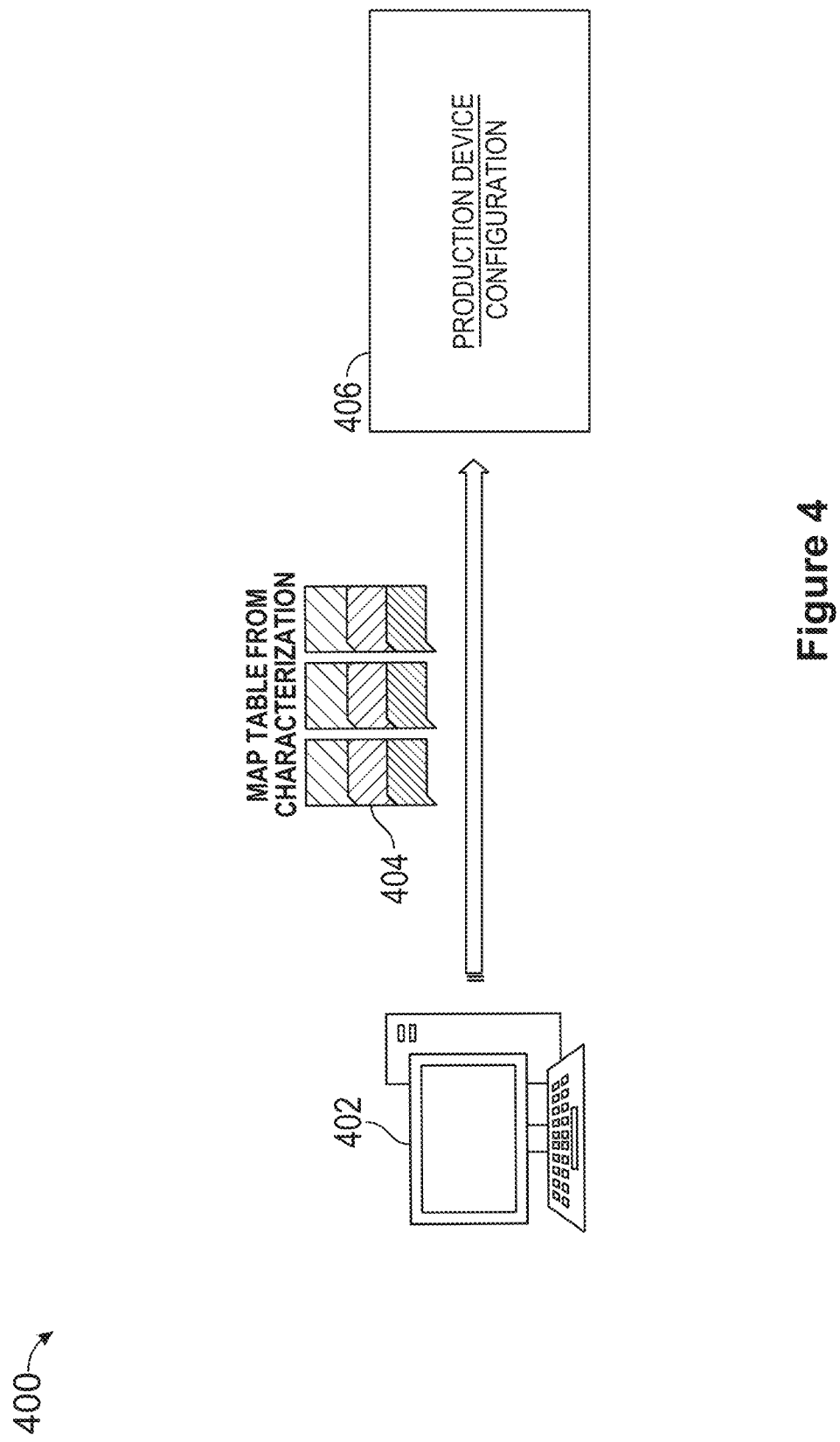
FIG. 4 shows a schematic diagram for an example process for downloading one or more map tables from a host computer to a storage device, according to one or more embodiments.

In some aspects, when a device is manufactured and/or configured, the map table described above may be downloaded as a configuration file using a conventional method. FIG. 4 shows a schematic diagram for an example process 400 for downloading map table(s) 404 from a host computer 402 to a storage device 406, according to one or more embodiments.

After map tables are downloaded as part of device configuration, a device firmware code may monitor device operations and compare runtime information against the configured map table. A single temperature sensor may be mounted on an application specific integrated circuit (ASIC)) for determining a base or boot-up temperature. This sensor can be a low cost and/or less accurate sensor. This sensor may be used only to determine the start-up temperature. This is useful to identify situations when a device is operating in a high temperature environment or a device that was already used (and is therefore hot), and may help with plugging out or plugging in devices after detecting extreme conditions.

Figure 5:
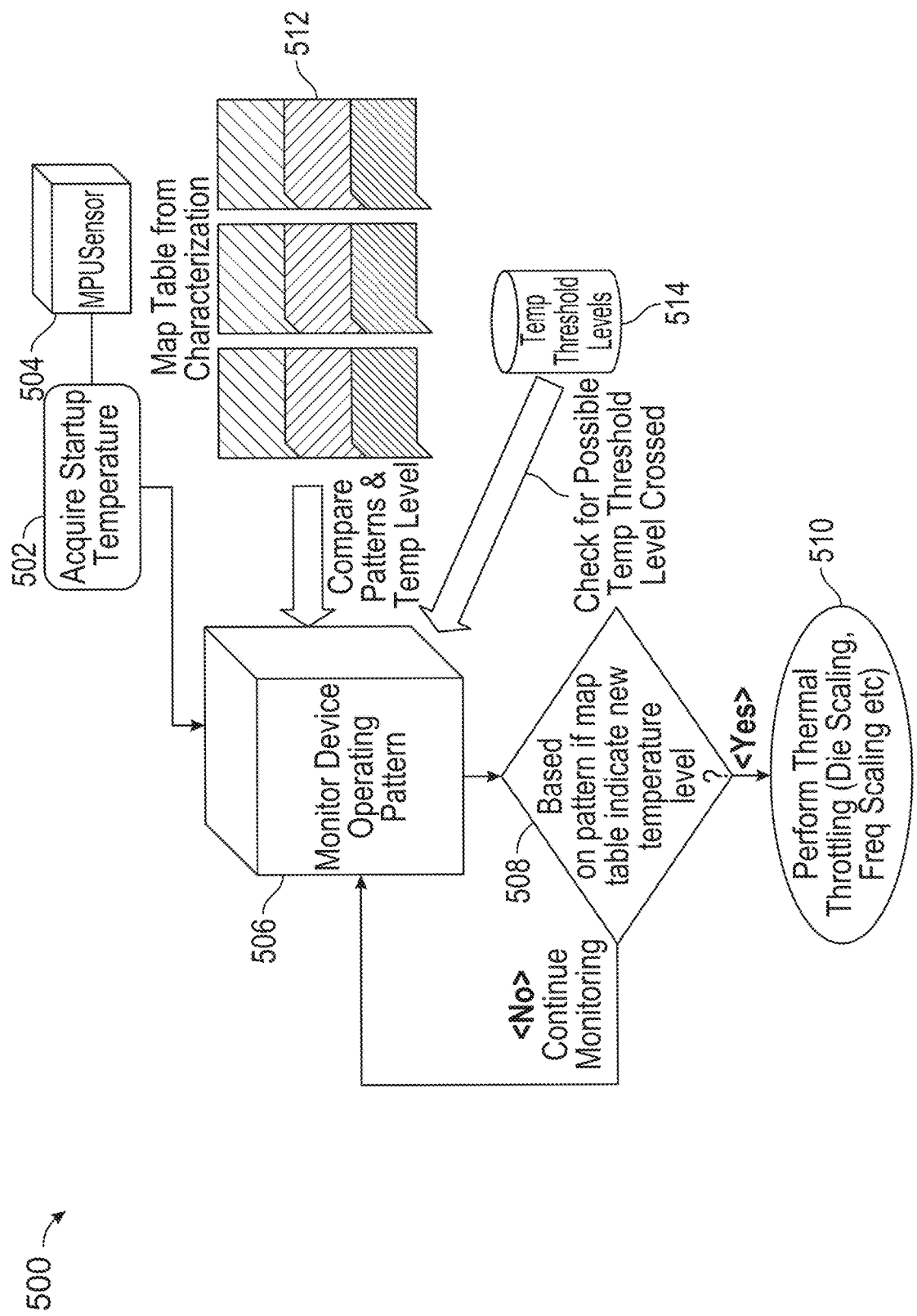
FIG. 5 is a schematic diagram of an example process for thermal throttling, according to one or more embodiments.

FIG. 5 is a schematic diagram of an example process 500 for thermal throttling, according to one or more embodiments. A device may poll (502) a sensor (e.g., an MPU sensor 504) once during a boot-up, to determine a base temperature (sometimes referred to as a start-up temperature). The device may continuously monitor (506) the device operations and check or compare against a map table (e.g., map table 512) from characterization described above. Based on the base temperature and the pattern of operations, a controller may predict the current temperature of the device using the map table. The controller may also compare (508) the predicted temperature with throttling levels 514, and perform (or cause to perform) cool down operations 510 (e.g., die scaling, frequency scaling) as needed. In some aspects, the predicted temperature becomes base temperature for a next iteration and the steps may be repeated and monitoring may continue.

In some aspects, the device may have another sensor at a predetermined strategic location. That sensor's output may be used as feedback to align the firmware simulation model for simulating multiple sensors. The proposed device may have bare minimum one or two sensors put together as against multiple sensors in conventional storage devices.

Figure 6A:
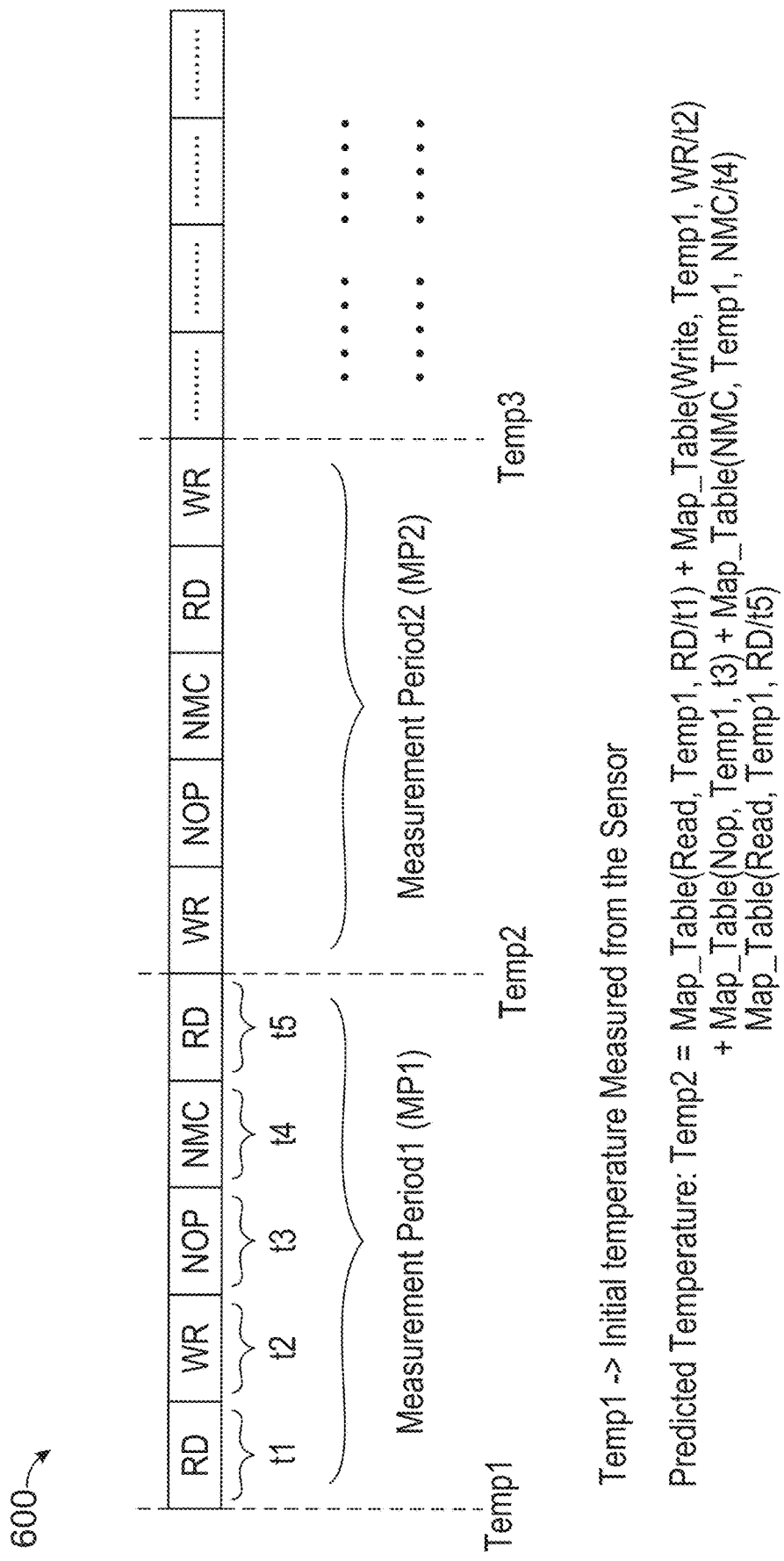
FIG. 6A is a schematic diagram for example thermal throttling using usage monitoring and map tables, according to one or more embodiments.

FIG. 6A is a schematic diagram for example thermal throttling 600 using usage monitoring and map tables, according to one or more embodiments. In some aspects, a device may monitor current operations and/or records/stores information related to the operations. For measurement period(s) (e.g., measurement period 1 (MP1) or measurement period 2 (MP2)), the device may predict the temperature based on the previous temperature and mapping the operations against the values in the configuration map table. For the example shown in FIG. 6A, the device may measure, from the sensor, a temperature Temp1 at the beginning of MP1. The host sends the following commands during MP1: RD (read) for a duration of t1, WR (write) for a duration of t2, NOP (no operation) for a duration of t3, NMC (non-media command) for a duration of t4, and RD (read) for a duration of t5. Temperature Temp2 at the end of MP1 may be calculated using the formula Temp2=Map_Table(Read, Temp1, RD/t1)+Map_Table(Write, Temp1, WR/t2)+Map_Table(Nop, Temp1, t3)+Map_Table(NMC, Temp1, NMC/t4)+Map_Table(Read, Temp1, RD/t5). Similar logic may be used for predicting Temp3, with Temp2 as initial temperature, and so on. Examples of map tables that may be used for this specific example are shown in FIG. 6B, according to one or more embodiments. Table 602 corresponds to a table for write commands, and includes current temperature levels, write speeds, duration, and change in temperature, as columns. Table 604 corresponds to non-media commands, and includes current temperature level, number of commands per second, duration, and change in temperature, as columns. Table 606 corresponds to read commands, and includes current temperature level, read speeds, duration, and change in temperature, as columns. Table 608 corresponds to no operation, and includes current temperature level, duration, and change in temperature, as columns. In these tables, each row corresponds to a temperature level.

Equation (1) shown below may be used for computing predicted temperature based on operations for a given period P, start temperature and speed. N is the number of operations for the period P.

$$\text{Predicted Temperature} = \sum_{i=0}^{N} \text{Map Table}(Opertion, \text{Start Temperature}, \text{Speed}) \quad (1)$$

After predicting the temperature level, the device may determine if the temperature is above a threshold level. If the temperature is above the threshold level, the device may take preventive actions to reduce the temperature using thermal throttling techniques. In this way, device may perform thermal throttling using a single sensor.

In some aspects, the characterization may be performed using a single model, and/or the map table may be configured across multiple related products.

Physical sensors have an associated cost and the expense limits usability. The techniques described herein help address this problem. Resulting cost advantages are proportional to the number of sensors being removed. Total cost savings for a product may include number of units produced times a total number of sensors required times per sensor cost. Power required for multiple sensors may be saved. Sensors typically take a current rating from 10 µA to 80 µA with supply voltage requirement of 1.6 Volts to 3.6 Volts. The techniques described herein may be used to replace sensors. Firmware logic for polling the values of these sensors (sensors that may be connected via different interfaces) may be replaced with the look up table method described above, which may cut down the overhead of polling the sensors. Research and development involved in identifying and deploying sensors may be saved. The number of sensors required may be reduced to just one sensor. In this way, the identification process for identifying multiple sensors during a product life cycle is minimized. Typical footprint of the sensors may be 1 milli-meter by 1 milli-meter. Considering the sensor footprint and corresponding interface buses, there may be spatial benefits in terms of placing the components in a printed circuit board.

Figure 7:
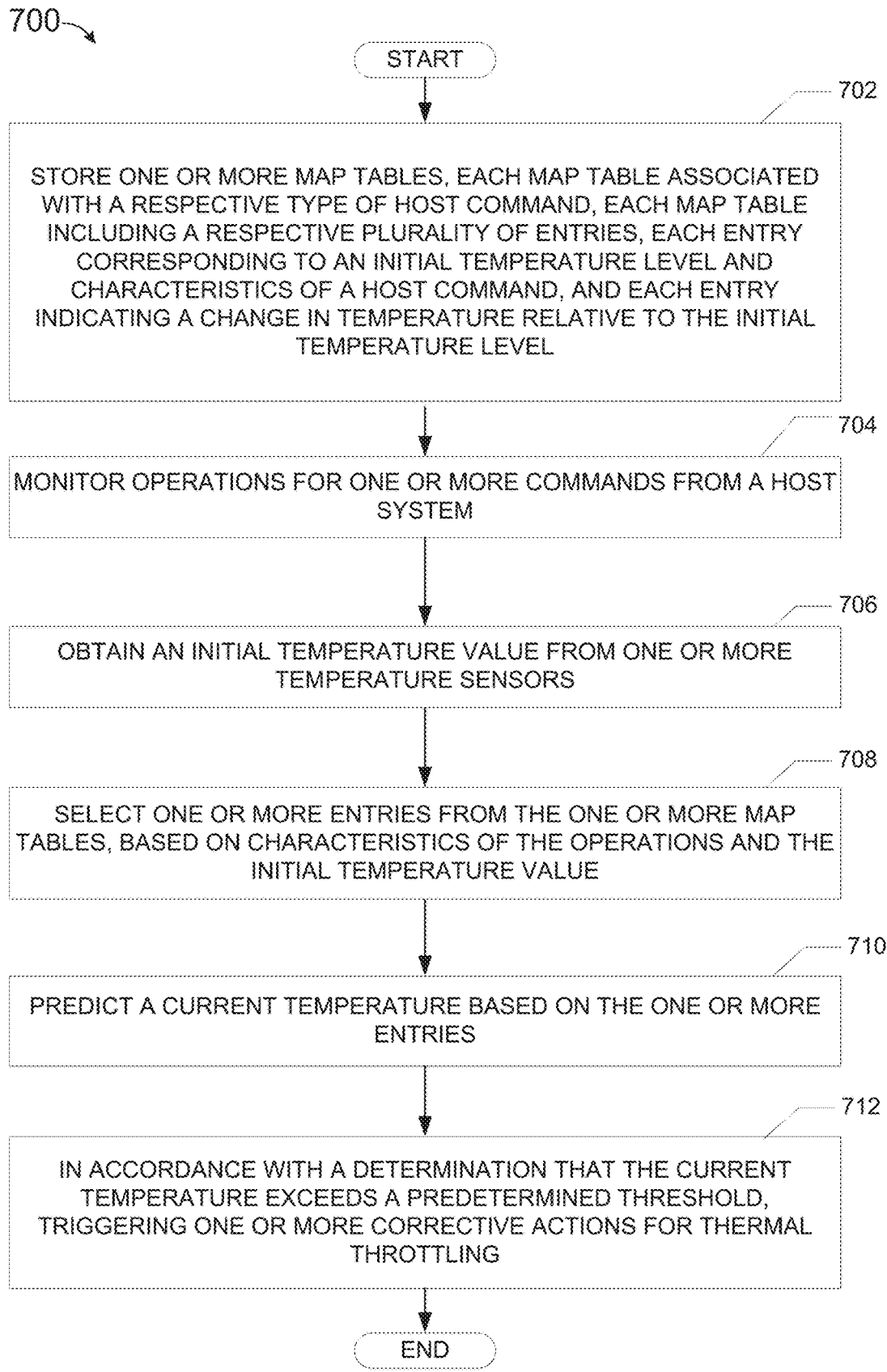
FIG. 7 is a flowchart illustrating an example process for stream data management in a storage device, according to one or more embodiments.

It may be instructive to describe the structures shown in FIGS. 1, 2, 3, 4, 5, and 6, with respect to FIG. 7, a flowchart illustrating an example process 700 for simulating multi-sensor environment for thermal throttling in a storage device, according to one or more embodiments. One or more blocks of FIG. 7 may be executed by a computing system (including, e.g., a controller of a flash memory, a data storage controller of a data storage system or a solid state storage device (SSD), a processor, or the like). Example of a computing system or a controller may be the controller 101. Similarly, a non-transitory machine-readable medium may include machine-executable instructions thereon that, when executed by a computer or machine, perform the blocks of FIG. 7. The steps of process 700 may be implemented as hardware, firmware, software, or a combination thereof. For example, a data storage device (e.g., the storage device 100) includes a submission queue for receiving host commands from a host system. The data storage device may include a host interface for coupling the data storage device to a host system, a device memory, a memory including one or more map tables, and one or more temperature sensors configured to sense temperature, and a controller (e.g., the controller 101). Each map table (e.g., the map tables 328, 330, 332, and 334) may be associated with a respective type of host command. Each map table may include a respective plurality of entries, each entry may correspond to an initial temperature level and characteristics of a host command, and each entry may indicate a change in temperature relative to the initial temperature level.

The controller may be configured to store (702) the one or more map tables. The controller may be configured to monitor (704) operations for one or more commands from the host system. The controller may also be configured to obtain (706) an initial temperature value from the one or more temperature sensors. The controller may also be configured to select (708) one or more entries from the one or more map tables, based on characteristics of the operations and the initial temperature value. The controller may also be configured to predict (710) a current temperature based on the one or more entries. The controller may also be configured to, in accordance with a determination that the current temperature exceeds a predetermined threshold, trigger (712) one or more corrective actions for thermal throttling.

In some aspects, the controller 101 may be configured to: monitor the operations for the one or more commands for a predetermined measurement period; and obtain the initial temperature value from the one or more temperature sensors when the predetermined measurement period starts. Examples of these operations are described above in reference to FIG. 6A, according to one or more embodiments.

In some aspects, the controller 101 may be configured to monitor the operations for the one or more commands by detecting a type of host command (e.g., a read versus a write versus a no operation versus a non-media command) and a duration for each command.

In some aspects, the controller 101 may be configured to detect a read speed for read commands, a write speed for write commands, and a number of commands per second for non-media commands.

In some aspects, the controller 101 may be configured to predict the current temperature based on (i) retrieving a respective entry for each of the one or more commands using the initial temperature value, and (ii) summing retrieved entries, an example of which is described above in reference to FIG. 6A, according to one or more embodiments.

In some aspects, the one or more map tables may include a table for write commands, a table for read commands, a table for non-media commands and a table for no operation, examples of which are described above in reference to FIGS. 3B-3J and FIG. 6B, according to one or more embodiments. In some aspects, each entry in the table for write commands may correspond to a write speed and a duration for a write command. In some aspects, each entry in the table for read commands may correspond to a read speed and a duration for a read command. In some aspects, each entry in the table for non-media commands may correspond to a number of non-media commands per second and a duration for a non-media command. In some aspects, each entry in the table for no operations may correspond to a duration for a no operation.

In some aspects, the controller 101 may be configured to perform, for the one or more corrective actions, at least one operation selected from the group consisting of: die scaling and frequency scaling.

In some aspects, the controller 101 may be configured to (i) initially poll the one or more temperature sensors, during a bootup sequence, to obtain a base temperature, and (ii) in accordance with a determination that the base temperature exceeds the predetermined threshold, trigger the one or more corrective actions for thermal throttling, before monitoring operations, for the one or more commands. Examples of these operations are described above in reference to FIG. 5, according to one or more embodiments.

In some aspects, the controller 101 may be configured to perform monitoring the operations, obtaining the initial temperature value, selecting the one or more entries, predicting the current temperature, and triggering the one or more corrective actions for thermal throttling, while processing the one or more commands.

In some aspects, the controller 101 may be configured to repeat, for each of subsequent measurement periods: monitor operations for subsequent one or more commands from the host system; select subsequent one or more entries from the one or more map tables, based on characteristics of the operations for the subsequent one or more commands and the predicted current temperature as the initial temperature value; predict a new current temperature based on the subsequent one or more entries; and in accordance with a determination that the new current temperature exceeds the predetermined threshold, trigger the one or more corrective actions for thermal throttling.

In some aspects, the one or more temperature sensors may consist of one temperature sensor for the data storage device.

In one aspect, the device described herein may predict the temperature of the device without a need for multiple sensors. The techniques have several advantages over conventional methods. For example, in one or more aspects, a data storage device uses a reduced number of sensors. In one of the advantageous aspects, the method of the subject technology can predict the temperature of the data storage device using one temperature sensor. In contrast, conventional devices require multiple sensors (e.g., greater than four or a larger number of sensors). When the number of sensors are reduced (e.g., two or one), conventional devices cannot predict the temperature of the device accurately.

Various examples of aspects of the disclosure are described below. These are provided as examples, and do not limit the subject technology.

One or more aspects of the subject technology provide a data storage device that may include a host interface for coupling the data storage device to a host system, a device memory, a memory including one or more map tables, and one or more temperature sensors configured to sense temperature, and a controller. Each map table may be associated with a respective type of host command. Each map table may include a respective plurality of entries, each entry may correspond to an initial temperature level and characteristics of a host command, and each entry may indicate a change in temperature relative to the initial temperature level.

The controller may be configured to store the one or more map tables. The controller may be configured to monitor operations for one or more commands from the host system. The controller may also be configured to obtain an initial temperature value from the one or more temperature sensors. The controller may also be configured to select one or more entries from the one or more map tables, based on characteristics of the operations and the initial temperature value. The controller may also be configured to predict a current temperature based on the one or more entries. The controller may also be configured to, in accordance with a determination that the current temperature exceeds a predetermined threshold, trigger one or more corrective actions for thermal throttling.

In some aspects, the controller may be configured to: monitor the operations for the one or more commands for a predetermined measurement period; and obtain the initial temperature value from the one or more temperature sensors when the predetermined measurement period starts.

In some aspects, the controller may be configured to monitor the operations for the one or more commands by detecting a type of host command (e.g., a read versus a write versus a no operation versus a non-media command) and a duration for each command.

In some aspects, the controller may be configured to detect a read speed for read commands, a write speed for write commands, and a number of commands per second for non-media commands.

In some aspects, the controller may be configured to predict the current temperature based on (i) retrieving a respective entry for each of the one or more commands using the initial temperature value, and (ii) summing retrieved entries.

In some aspects, the one or more map tables may include a table for write commands, a table for read commands, a table for non-media commands and a table for no operation, according to one or more embodiments. In some aspects, each entry in the table for write commands may correspond to a write speed and a duration for a write command. In some aspects, each entry in the table for read commands may correspond to a read speed and a duration for a read command. In some aspects, each entry in the table for non-media commands may correspond to a number of non-media commands per second and a duration for a non-media command. In some aspects, each entry in the table for no operations may correspond to a duration for a no operation.

In some aspects, the controller may be configured to perform, for the one or more corrective actions, at least one operation selected from the group consisting of: die scaling and frequency scaling.

In some aspects, the controller may be configured to (i) initially poll the one or more temperature sensors, during a bootup sequence, to obtain a base temperature, and (ii) in accordance with a determination that the base temperature exceeds the predetermined threshold, trigger the one or more corrective actions for thermal throttling, before monitoring operations, for the one or more commands.

In some aspects, the controller may be configured to perform monitoring the operations, obtaining the initial temperature value, selecting the one or more entries, predicting the current temperature, and triggering the one or more corrective actions for thermal throttling, while processing the one or more commands.

In some aspects, the controller may be configured to repeat, for each of subsequent measurement periods: monitor operations for subsequent one or more commands from the host system; select subsequent one or more entries from the one or more map tables, based on characteristics of the operations for the subsequent one or more commands and the predicted current temperature as the initial temperature value; predict a new current temperature based on the subsequent one or more entries; and in accordance with a determination that the new current temperature exceeds the predetermined threshold, trigger the one or more corrective actions for thermal throttling.

In some aspects, the one or more temperature sensors may consist of one temperature sensor for the data storage device.

In other aspects, methods are provided for simulating multi-sensor environment for thermal throttling in storage devices. According to some aspects, a method may be implemented using one or more controllers for one or more data storage devices. The method may include storing one or more map tables, each map table associated with a respective type of host command, each map table including a respective plurality of entries, each entry corresponding to an initial temperature level and characteristics of a host command, and each entry indicating a change in temperature relative to the initial temperature level. The method may also include monitoring operations for one or more commands from a host system. The method may also include obtaining an initial temperature value from one or more temperature sensors. The method may also include selecting one or more entries from the one or more map tables, based on characteristics of the operations and the initial temperature value. The method may also include predicting a current temperature based on the one or more entries. The method may also include, in accordance with a determination that the current temperature exceeds a predetermined threshold, triggering one or more corrective actions for thermal throttling.

In further aspects, a system may include a means for storing one or more map tables, each map table associated with a respective type of host command, each map table including a respective plurality of entries, each entry corresponding to an initial temperature level and characteristics of a host command, and each entry indicating a change in temperature relative to the initial temperature level. The system also includes a means for monitoring operations for one or more commands from the host system. The system also includes a means for obtaining an initial temperature value from the one or more temperature sensors. The system also includes a means for selecting one or more entries from the one or more map tables, based on characteristics of the operations and the initial temperature value. The system also includes a means for predicting a current temperature based on the one or more entries. The system also includes a means for, in accordance with a determination that the current temperature exceeds a predetermined threshold, triggering one or more corrective actions for thermal throttling.

Disclosed are systems and methods providing efficient thermal throttling. Thus, the described methods and systems provide performance benefits that improve the functioning of a storage device.

It is understood that other configurations of the subject technology will become readily apparent to those skilled in the art from the detailed description herein, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A data storage device, comprising:
a host interface for coupling the data storage device to a host system
a device memory;
a memory including one or more map tables, each map table associated with a respective type of host command, each map table including a respective plurality of entries, each entry corresponding to an initial temperature level and characteristics of a host command, and each entry indicating a change in temperature relative to the initial temperature level;
one or more temperature sensors configured to sense temperature; and
a controller configured to:
monitor operations for one or more commands from the host system;
obtain an initial temperature value from the one or more temperature sensors;
select one or more entries from the one or more map tables, based on characteristics of the operations and the initial temperature value;
predict a current temperature based on the one or more entries; and
in accordance with a determination that the current temperature exceeds a predetermined threshold, trigger one or more corrective actions for thermal throttling.

2. The data storage device of claim 1, wherein the controller is configured to:
monitor the operations for the one or more commands for a predetermined measurement period; and
obtain the initial temperature value from the one or more temperature sensors when the predetermined measurement period starts.

3. The data storage device of claim 1, wherein the controller is configured to:
monitor the operations for the one or more commands by detecting a type of host command and a duration for each command.

4. The data storage device of claim 3, wherein the controller is configured to:
detect a read speed for read commands, a write speed for write commands, and a number of commands per second for non-media commands.

5. The data storage device of claim 1, wherein the controller is configured to:
predict the current temperature based on (i) retrieving a respective entry for each of the one or more commands using the initial temperature value, and (ii) summing retrieved entries.

6. The data storage device of claim 1, wherein the one or more map tables include a table for write commands, a table for read commands, a table for non-media commands and a table for no operation.

7. The data storage device of claim 6, wherein:
each entry in the table for write commands corresponds to a write speed and a duration for a write command;
each entry in the table for read commands corresponds to a read speed and a duration for a read command;
each entry in the table for non-media commands corresponds to a number of non-media commands per second and a duration for a non-media command; and
each entry in the table for no operations corresponds to a duration for a no operation.

8. The data storage device of claim 1, wherein the controller is configured to:
perform, for the one or more corrective actions, at least one operation selected from the group consisting of: die scaling and frequency scaling.

9. The data storage device of claim 1, wherein the controller is configured to:
initially poll the one or more temperature sensors, during a bootup sequence, to obtain a base temperature; and
in accordance with a determination that the base temperature exceeds the predetermined threshold, trigger the one or more corrective actions for thermal throttling, before monitoring operations, for the one or more commands.

10. The data storage device of claim 1, wherein the controller is configured to:
perform monitoring the operations, obtaining the initial temperature value, selecting the one or more entries, predicting the current temperature, and triggering the one or more corrective actions for thermal throttling, while processing the one or more commands.

11. The data storage device of claim 1, wherein the controller is configured to repeat, for each of subsequent measurement periods:
monitor operations for subsequent one or more commands from the host system;
select subsequent one or more entries from the one or more map tables, based on characteristics of the operations for the subsequent one or more commands and the predicted current temperature as the initial temperature value;
predict a new current temperature based on the subsequent one or more entries; and
in accordance with a determination that the new current temperature exceeds the predetermined threshold, trigger the one or more corrective actions for thermal throttling.

12. The data storage device of claim 1, wherein the one or more temperature sensors consist of one temperature sensor for the data storage device.

13. A method implemented using one or more controllers for one or more data storage devices, the method comprising:
storing one or more map tables, each map table associated with a respective type of host command, each map table including a respective plurality of entries, each entry corresponding to an initial temperature level and characteristics of a host command, and each entry indicating a change in temperature relative to the initial temperature level;
monitoring operations for one or more commands from a host system;
obtaining an initial temperature value from one or more temperature sensors;
selecting one or more entries from the one or more map tables, based on characteristics of the operations and the initial temperature value;
predicting a current temperature based on the one or more entries; and
in accordance with a determination that the current temperature exceeds a predetermined threshold, triggering one or more corrective actions for thermal throttling.

14. The method of claim 13, further comprising:
monitoring the operations for the one or more commands for a predetermined measurement period; and
obtaining the initial temperature value from the one or more temperature sensors when the predetermined measurement period starts.

15. The method of claim 13, further comprising:
monitoring the operations for the one or more commands by detecting a type of host command and a duration for each command.

16. The method of claim 15, further comprising:
detecting a read speed for read commands, a write speed for write commands, and a number of commands per second for non-media commands.

17. The method of claim 13, further comprising:
predicting the current temperature based on (i) retrieving a respective entry for each of the one or more commands using the initial temperature value, and (ii) summing retrieved entries.

18. The method of claim 13, wherein the one or more map tables include a table for write commands, a table for read commands, a table for non-media commands and a table for no operation.

19. The method of claim 18, wherein:
each entry in the table for write commands corresponds to a write speed and a duration for a write command;
each entry in the table for read commands corresponds to a read speed and a duration for a read command;
each entry in the table for non-media commands corresponds to a number of non-media commands per second and a duration for a non-media command; and
each entry in the table for no operations corresponds to a duration for a no operation.

20. A system, comprising:
means for storing one or more map tables, each map table associated with a respective type of host command, each map table including a respective plurality of entries, each entry corresponding to an initial temperature level and characteristics of a host command, and each entry indicating a change in temperature relative to the initial temperature level;
means for monitoring operations for one or more commands from a host system;
means for obtaining an initial temperature value from one or more temperature sensors;
means for selecting one or more entries from one or more map tables, based on characteristics of the operations and the initial temperature value;
means for predicting a current temperature based on the one or more entries; and
means for, in accordance with a determination that the current temperature exceeds a predetermined threshold, triggering one or more corrective actions for thermal throttling.

* * * * *